(12) United States Patent
Tseng

(10) Patent No.: US 8,781,268 B2
(45) Date of Patent: Jul. 15, 2014

(54) LASER SIGNAL TRANSMISSION DEVICE

(71) Applicant: Kuo-Fong Tseng, New Taipei (TW)

(72) Inventor: Kuo-Fong Tseng, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 71 days.

(21) Appl. No.: 13/660,004

(22) Filed: Oct. 25, 2012

(65) Prior Publication Data

US 2013/0315529 A1 Nov. 28, 2013

(30) Foreign Application Priority Data

May 22, 2012 (TW) .............................. 101118243 A

(51) Int. Cl.
*G02B 6/12* (2006.01)
*H01L 33/00* (2010.01)

(52) U.S. Cl.
USPC .................................. 385/14; 385/16; 257/88

(58) Field of Classification Search
USPC ........ 385/10–16, 88–90; 250/227.24; 257/88, 257/199
See application file for complete search history.

(56) References Cited

U.S. PATENT DOCUMENTS

| | | | | |
|---|---|---|---|---|
| 3,982,123 | A * | 9/1976 | Goell et al. | 250/227.24 |
| 4,807,227 | A * | 2/1989 | Fujiwara et al. | 398/48 |
| 4,945,531 | A * | 7/1990 | Suzuki | 398/91 |
| 5,159,481 | A * | 10/1992 | Maeda | 398/202 |
| 6,580,863 | B2 * | 6/2003 | Yegnanarayanan et al. | 385/132 |
| 6,886,365 | B2 * | 5/2005 | Rumpf et al. | 65/385 |
| 7,031,610 | B2 * | 4/2006 | Honda et al. | 398/85 |
| 8,208,196 | B2 * | 6/2012 | Fermann et al. | 359/328 |
| 2003/0081924 | A1 * | 5/2003 | Yegnanarayanan et al. | 385/132 |
| 2004/0007710 | A1 * | 1/2004 | Roy et al. | 257/88 |
| 2004/0151420 | A1 * | 8/2004 | Goodfellow | 385/15 |
| 2013/0315529 | A1 * | 11/2013 | Tseng | 385/14 |

* cited by examiner

*Primary Examiner* — Akm Enayet Ullah
(74) *Attorney, Agent, or Firm* — Novak Druce Connolly Bove + Quigg LLP

(57) ABSTRACT

A laser signal transmission device includes a transparent substrate, a first wavelength light emitting module embedded in the substrate, a first multi-mode optical fiber embedded in the substrate, and a single-mode optical fiber. The first wavelength light emitting module is configured for emitting a first laser signal having a first wavelength. The first multi-mode optical fiber is aligned with the first wavelength light emitting module. One end of the single-mode optical fiber is embedded in the substrate and aligned and optically coupled with the first multi-mode optical fiber, the other end is exposed at the substrate. The first multi-mode optical fiber is arranged between the first wavelength light emitting module and the single-mode optical fiber, and the longitudinal direction of the first multi-mode optical fiber coincides with that of the single-mode optical fiber.

9 Claims, 2 Drawing Sheets

LASER SIGNAL TRANSMISSION DEVICE

BACKGROUND

1. Technical Field

The present disclosure relates to laser signal transmission technology and, particularly, to a laser signal transmission device.

2. Description of Related Art

Single-mode optical fibers are preferred for use in a laser signal transmission device due to their high transmission speed and signal integrity. A single-mode optical fiber includes a core and a cladding layer wrapped around the core. The laser signal transmission device further includes a converging lens aligned with and optically coupled with the core. When in use, a laser signal is converged by the converging lens and is then introduced into the core or a laser signal emitted from the core is converged by the converging lens. However, it is difficult to make the converging lens align with the core due to the diameter of the core being very small (between 8 and 10.5 μm). Any alignment which is less than optimal will influence the production efficiency and the production yield of the laser signal transmission device.

Therefore, it is desirable to provide a laser signal transmission device, which can overcome or at least alleviate the limitations described.

DETAILED DESCRIPTION

Figure 1:
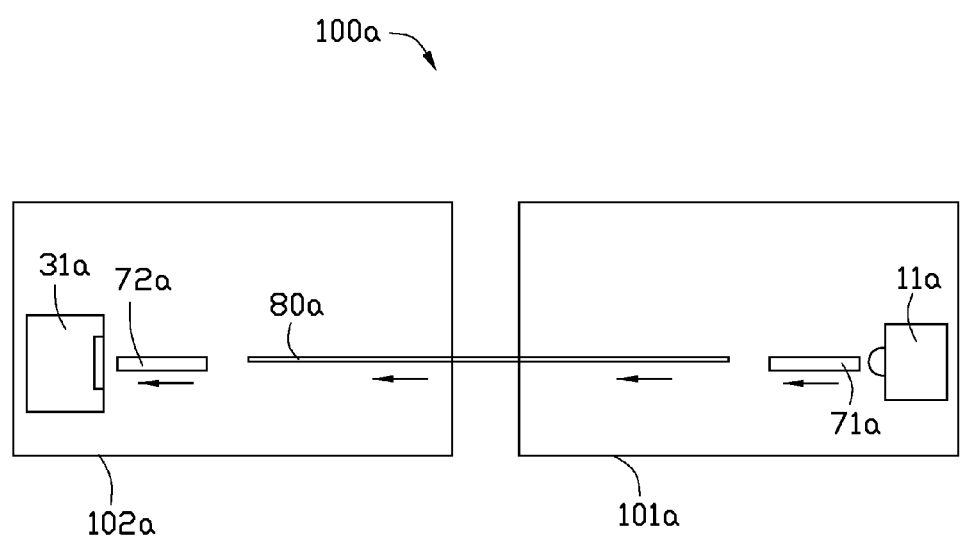
FIG. 1 is a schematic view of a laser signal transmission device, according to a first exemplary embodiment.

Referring to FIG. 1, a laser signal transmission device 100a, according to a first exemplary embodiment, is shown. The laser signal transmission device 100a includes a first substrate 101a, a second substrate 102a, a light emitting module 11a, a light receiving module 31a, a first multi-mode optical fiber 71a, a second multi-mode optical fiber 72a, and a single-mode optical fiber 80a.

The first substrate 101a and the second substrate 102a are made of transparent material. The first substrate 101a is distanced from the second substrate 102a.

The light emitting module 11a and the first multi-mode optical fiber 71a are embedded in the first substrate 101a. The light emitting module 11a is a vertical cavity surface emitting laser (VCSEL) diode and is configured for emitting a laser signal having a predetermined wavelength. The first multi-mode optical fiber 71a is aligned with the light emitting module 11a and is configured for transmitting the laser signal from the light emitting module 11a.

The light receiving module 31a and the second multi-mode optical fiber 72a are embedded in the second substrate 102a. The second multi-mode optical fiber 72a is aligned with the light receiving module 31a. The light receiving module 31a is a photo diode and is configured for receiving the laser signal transmitted from the second multi-mode optical fiber 72a.

One end of the single-mode optical fiber 80a is embedded in the first substrate 101a and is aligned with and optically coupled with the first multi-mode optical fiber 71a, and the other end is embedded in the second substrate 102a and is aligned with and optically coupled with the second multi-mode optical fiber 72a. That is, the first multi-mode optical fiber 71a, the single-mode optical fiber 80a, and the second multi-mode optical fiber 72a are arranged in a line in that order. In other words, the longitudinal direction of the first multi-mode optical fiber 71a coincides with that of the single-mode optical fiber 80a, and also with that of the second multi-mode optical fiber 72a.

When in use, a laser signal emitted from the light emitting module 11a passes first through the first multi-mode optical fiber 71a, then through the single-mode optical fiber 80a, and then through the second multi-mode optical fiber 72a, and finally reaches the light receiving module 31a.

In the laser signal transmission device 100a, the core of the single-mode optical fiber 80a can be easily aligned with the core of the first multi-mode optical fiber 71a and the core of the second multi-mode optical fiber 72a due to the diameters of the cores of the multi-mode optical fibers 71a, 72a being bigger than that of the single-mode optical fiber 80a. Therefore, the production efficiency and the production yield of the laser signal transmission device 100a can be assured.

Figure 2:
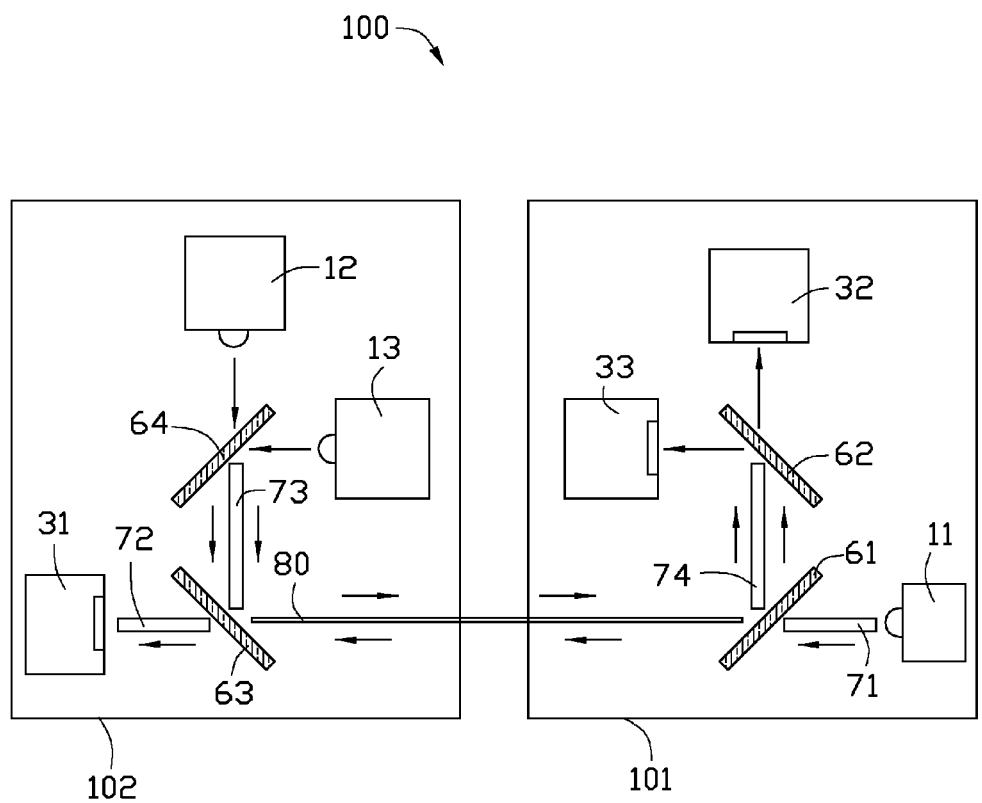
FIG. 2 is a schematic view of a laser signal transmission device, according to a second exemplary embodiment.

Referring to FIG. 2, a laser signal transmission device 100 according to a second exemplary embodiment is shown. The laser signal transmission device 100 includes a first substrate 101, a second substrate 102, a first wavelength light emitting module 11, a second wavelength light emitting module 12, a third wavelength light emitting module 13, a first multi-mode optical fiber 71, a second multi-mode optical fiber 72, a third multi-mode optical fiber 73, a fourth multi-mode optical fiber 74, a first wavelength division multiplex (WDM) filter 61, a second WDM filter 62, a third WDM filter 63, a fourth WDM filter 64, a first wavelength light receiving module 31, a second wavelength light receiving module 32, a third wavelength light receiving module 33, and a single-mode optical fiber 80.

The first substrate 101 and the second substrate 102 are made of transparent material. The first substrate 101 is distanced from the second substrate 102. The first wavelength light emitting module 11, the first WDM filter 61, the second WDM filter 62, the first multi-mode optical fiber 71, the fourth multi-mode optical fiber 74, the second wavelength light receiving module 32, and the third wavelength light receiving module 33 are embedded in the first substrate 101. The first wavelength light receiving module 31, the third WDM filter 63, the fourth WDM filter 64, the second multi-mode optical fiber 72, the third multi-mode optical fiber 73, the second wavelength light emitting module 12, and the third wavelength light emitting module 13 are embedded in the second substrate 102. One end of the single-mode optical fiber 80 is embedded in the first substrate 101, and the other end is embedded in the second substrate 102.

The first wavelength light emitting module 11 is configured for emitting a first laser signal having a first predetermined wavelength. The first multi-mode optical fiber 71, the first WDM filter 61, the single-mode optical fiber 80, the third WDM filter 63, the second multi-mode optical fiber 72, and the first wavelength light receiving module 31 are arranged in the light path of the first laser signal in that order. One end of the single-mode optical fiber 80 is aligned with and optically coupled with the first multi-mode optical fiber 71, and the other end is aligned with and optically coupled with the second multi-mode optical fiber 72. The longitudinal direction of the first multi-mode optical fiber 71 coincides with that of the single-mode optical fiber 80, and also with that of the second multi-mode optical fiber 72. The first WDM filter 61 is obliquely arranged between the first multi-mode optical fiber 71 and the single-mode optical fiber 80. The third WDM filter 63 is obliquely arranged between the second multi-mode optical fiber 72 and the single-mode optical fiber 80. The first wavelength light receiving module 31 is configured for receiving the first laser signal. The first laser signal passes through the first multi-mode optical fiber 71, the first WDM filter 61, the single-mode optical fiber 80, the third WDM filter 63, and the second multi-mode optical fiber 72 in turn and then reaches the first wavelength light receiving module 31.

The second wavelength light emitting module 12 is configured for emitting a second laser signal having a second predetermined wavelength. The fourth WDM filter 64 and the third multi-mode optical fiber 73 are arranged in the light path of the second laser signal in that order. The longitudinal direction of the third multi-mode optical fiber 73 is perpendicular to that of the second multi-mode optical fiber 72. The second laser signal emitted from the second wavelength light emitting module 12 passes through the fourth WDM filter 64 and then through the third multi-mode optical fiber 73, and is then reflected by the third WDM filter 63 toward the single-mode optical fiber 80. The first WDM filter 61 reflects the second laser signal from the single-mode optical fiber 80. The fourth multi-mode optical fiber 74, the second WDM filter 62, and the second wavelength light receiving module 32 are arranged in that order along the reflecting direction of the second laser signal. The longitudinal direction of the fourth multi-mode optical fiber 74 is perpendicular to that of the first multi-mode optical fiber 71. The second wavelength receiving module 32 is configured for receiving the second laser signal.

The third wavelength light emitting module 13 is configured for emitting a third laser signal having a third predetermined wavelength. The third wavelength light receiving module 33 is configured for receiving the third laser signal. The third laser signal is reflected by the fourth WDM filter 64 towards the third multi-mode optical fiber 73, and reflected by the third WDM filter 63 towards the single-mode optical fiber 80, and further reflected by the first WDM filter 61 towards the fourth multi-mode optical fiber 74, and then reflected by the second WDM filter 62 towards the third wavelength light receiving module 33.

Advantages of the laser signal transmission device 100 of the second exemplary embodiment are similar to those of the laser signal transmission device 100a of the first exemplary embodiment.

Even though numerous characteristics and advantages of the present embodiments have been set fourth in the foregoing description, together with details of the structures and functions of the embodiments, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. A laser signal transmission device comprising:
a transparent substrate;
a first wavelength light emitting module embedded in the substrate and configured for emitting a first laser signal having a first wavelength;
a first multi-mode optical fiber embedded in the substrate and aligned with the first wavelength light emitting module; and
a single-mode optical fiber, one end of the single-mode optical fiber embedded in the substrate and aligned with and optically coupled with the first multi-mode optical fiber, the other end extending beyond an edge of the substrate, the first multi-mode optical fiber arranged between the first wavelength light emitting module and the single-mode optical fiber, and the longitudinal direction of the first multi-mode optical fiber coinciding with that of the single-mode optical fiber.

2. The laser signal transmission device as claimed in claim 1, further comprising a first WDM filter, a second WDM filter, a second multi-mode optical fiber, and a second wavelength light receiving module, wherein the first WDM filter is obliquely arranged between the first multi-mode optical fiber and the single-mode optical fiber and configured for allowing the first laser signal to pass therethrough and reflecting a second laser signal having a second wavelength from the single-mode optical fiber, the second multi-mode optical fiber, the second WDM filter, and the second wavelength light receiving module are embedded in the substrate along the reflecting direction of the second laser signal in that order, the longitudinal direction of the second multi-mode optical fiber is perpendicular to that of the first multi-mode optical fiber, the second WDM filter is configured for allowing the second laser signal to pass therethrough, and the second wavelength receiving module is configured for receiving the second laser signal.

3. The laser signal transmission device as claimed in claim 1, further comprising a third wavelength light receiving module, wherein the first WDM filter is further configured for reflecting a third laser signal having a third wavelength, the second WDM filter is further configured for reflecting the third laser signal, the third wavelength light receiving module is embedded in the substrate and configured for receiving the third laser signal reflected by the second WDM filter.

4. A laser signal transmission device comprising:
a transparent substrate;
a first wavelength light receiving module embedded in the substrate;
a first multi-mode optical fiber embedded in the substrate and aligned with the first wavelength light receiving module; and
a single-mode optical fiber, one end of the single-mode optical fiber embedded in the substrate and aligned with and optically coupled with the first multi-mode optical fiber, the other end extending beyond an edge of the substrate, the first multi-mode optical fiber arranged between the first wavelength light receiving module and the single-mode optical fiber, the longitudinal direction of the first multi-mode optical fiber coinciding with that of the single-mode optical fiber, and the first wavelength light receiving module configured for receiving a first laser signal having a first wavelength transmitted through the single-mode optical fiber and the first multi-mode optical fiber.

5. The laser signal transmission device as claimed in claim 4, further comprising a first WDM filter, a second WDM filter, a second multi-mode optical fiber, and a second wavelength light emitting module, wherein the first WDM filter is obliquely arranged between the first multi-mode optical fiber and the single-mode optical fiber, the second wavelength light emitting module configured for emitting a second laser signal having a second wavelength, the second WDM filter and the second multi-mode optical fiber are arranged in that order along the light path of the second laser signal, the longitudinal direction of the second multi-mode optical fiber is perpendicular to that of the first multi-mode optical fiber, the second WDM filter is configured for allowing the second laser signal to pass therethrough, and the first WDM filter is configured for allowing the first laser signal from the single-mode optical fiber to pass therethrough and reflecting the second laser signal from the second multi-mode optical fiber.

6. The laser signal transmission device as claimed in claim 5, further comprising a third wavelength light emitting module, wherein the third wavelength light emitting module configured for emitting a third laser signal having a third wavelength towards the second WDM filter, the second WDM filter is further configured for reflecting the third laser signal towards the second multi-mode optical fiber, the first WDM filter further configured for reflecting the third laser signal from the second multi-mode optical fiber towards the single-mode optical fiber.

7. A laser signal transmission device comprising:
a first substrate made of transparent material;
a second substrate made of transparent material spaced from the first substrate;
a first wavelength light emitting module embedded in the first substrate and configured for emitting a first laser signal having a first wavelength;
a first multi-mode optical fiber embedded in the first substrate and aligned with the first wavelength light emitting module;
a first wavelength light receiving module embedded in the second substrate and configured for receiving the first laser signal;
a second multi-mode optical fiber embedded in the second substrate and aligned with the first wavelength light receiving module; and
a single-mode optical fiber, one end of the single-mode optical fiber embedded in the first substrate and aligned with and optically coupled with the first multi-mode optical fiber, and the other end embedded in the second substrate and aligned with and optically coupled with the second multi-mode optical fiber.

8. The laser signal transmission device as claimed in claim 7, further comprising a first WDM filter, a second WDM filter, a fourth multi-mode optical fiber, and a second wavelength light receiving module, embedded in the first substrate, and further comprising a third WDM filter, a fourth WDM filter, a third multi-mode optical fiber, and a second wavelength light emitting module, embedded in the second substrate, wherein the third WDM filter is obliquely arranged between the second multi-mode optical fiber and the single-mode optical fiber, the second wavelength light emitting module configured for emitting a second laser signal having a second wavelength, the fourth WDM filter and the third multi-mode optical fiber are arranged in that order along the light path of the second laser signal, the longitudinal direction of the third multi-mode optical fiber is perpendicular to that of the second multi-mode optical fiber, the fourth WDM filter is configured for allowing the second laser signal to pass therethrough, and the third WDM filter is configured for allowing the first laser signal from the single-mode optical fiber to pass therethrough and reflecting the second laser signal from the fourth multi-mode optical fiber, the first WDM filter is obliquely arranged between the first multi-mode optical fiber and the single-mode optical fiber and configured for allowing the first laser signal to pass therethrough and reflecting the second laser signal from the single-mode optical fiber, the fourth multi-mode optical fiber, the second WDM filter, and the second wavelength light receiving module are arranged along the reflecting direction of the second laser signal in that order, the longitudinal direction of the fourth multi-mode optical fiber is perpendicular to that of the first multi-mode optical fiber, the second WDM filter is configured for allowing the second laser signal to pass therethrough, and the second wavelength receiving module is configured for receiving the second laser signal.

9. The laser signal transmission device as claimed in claim 8, further comprising a third wavelength light receiving module and a third wavelength light emitting module, wherein the third wavelength light emitting module is configured for emitting a third laser signal having a third wavelength, the third laser signal is reflected by the fourth WDM filter towards the third multi-mode optical fiber, and reflected by the third WDM filter towards the single-mode optical fiber, and reflected by the first WDM filter towards the fourth multi-mode optical fiber, and then reflected by the second WDM filter towards the third wavelength light receiving module.

* * * * *